United States Patent [19]

Fryd et al.

[11] Patent Number: 4,562,100

[45] Date of Patent: * Dec. 31, 1985

[54] POLYIMIDE COATING COMPOSITIONS FROM DIESTERIFIED ANHYDRIDE AND AROMATIC DIAMINE

[75] Inventors: Michael Fryd, Haddonfield; Burt T. Merriman, Jr., Willingboro, both of N.J.

[73] Assignee: E. I. Du Pont de Nemours and Company, Wilmington, Del.

[*] Notice: The portion of the term of this patent subsequent to Aug. 6, 2002 has been disclaimed.

[21] Appl. No.: 650,913

[22] Filed: Sep. 14, 1984

[51] Int. Cl.$^4$ .................. B05D 3/02; C08G 69/26
[52] U.S. Cl. .................. 427/385.5; 252/62.3 Q; 427/82; 428/473.5; 524/600

[58] Field of Search .................. 427/82, 385.5; 252/62.3 Q, 570, 575; 428/473.5; 524/600, 606

[56] References Cited

U.S. PATENT DOCUMENTS

| | | | |
|---|---|---|---|
| 4,347,286 | 8/1982 | Ishizuka et al. | 427/385.5 X |
| 4,405,770 | 9/1983 | Schoenberg et al. | 526/259 |
| 4,439,579 | 3/1984 | Reiter et al. | 524/602 |
| 4,440,643 | 4/1984 | Makino et al. | 427/393.5 X |
| 4,444,823 | 4/1984 | Gagliani et al. | 428/473.5 X |
| 4,467,000 | 8/1984 | Economy et al. | 427/385.5 |

Primary Examiner—Thurman K. Page

[57] ABSTRACT

Composition for the application of planar polyimide coatings comprising an aprotic solvent solution of selected aromatic dianhydrides which have been at least 20% esterified with a volatile alcohol and an equivalent amount of selected aromatic diamine.

6 Claims, 2 Drawing Figures

POLYIMIDE COATING COMPOSITIONS FROM DIESTERIFIED ANHYDRIDE AND AROMATIC DIAMINE

FIELD OF THE INVENTION

The invention is directed to polyimide compositions, especially those which are capable of forming highly planar coatings.

BACKGROUND OF THE INVENTION

Polyimides find extensive use in electronic applications where they are useful in forming dielectric films on semiconductors devices. They are particularly useful as protective coatings for semiconductor devices.

It is well known in the polymer art to make thermally stable all-aromatic polyimides by the condensation polymerization of dianhydrides and diamines to form polyamic acid. Such polyimide precursors are disclosed inter alia in U.S. Pat. No. 3,179,634 to Edwards. These polyamic acids are readily dehydrated to the corresponding polyimides by heating at high temperatures, e.g. 300° to 400° C. These all-aromatic polyimides are not completely soluble and, therefore, protective films cannot be coated directly in the polyimide form. Instead, it is customary practice to use instead the precursor polyamic acids which have the advantage of being readily soluble in aprotic solvents. Such polyamic acid solutions are then coated to form the appropriate film and converted to the corresponding polyimide by heating the film at high temperature to effect volatilization of the solvent and dehydration of the polyamic acid to form the polyimide.

In the use of polyimide coatings as insulating layers over electronic devices, it is extremely important that the layer be as nearly planar as possible so that uniform overlying functional layers can be readily applied. As used herein, the term "planarity" refers to the ability of a material to flow over structures of various shapes and produce a planar surface. In other words, the polyimide layer should be flat and not exhibit the surface imperfections of the underlying substrate and/or electronic components. This is extremely difficult to do for the reason that, as solvent is evaporated during the conversion of the polyamic acid to the polyimide form, the coating shrinks and tends to become rigid and will not readily flow out to form a planar layer. Thus it would be highly desirable to have a coating solution in which the formation of the polyimide is delayed so that the reaction system is less viscous at the high solids level necessary to minimize film shrinkage.

BRIEF DESCRIPTION OF THE INVENTION

In one aspect, the invention is directed to a method of applying a polyimide coating having high planarity comprising the sequential steps:

(a) forming a solution in aprotic solvent of an aromatic dianhydride which has been at least 40% diesterified with a volatile alcohol;

(b) dissolving in the solution of step (a) a substantially equimolar amount of an aromatic diamine;

(c) applying the solution of step (b) to a substrate and heating it to a temperature of 200°-300° C. to effect de-esterification of the dianhydride with the formation of volatile alcohol therefrom, formation of polyamic acid by polycondensation of the dianhydride with the aromatic diamine and vaporization of volatile alcohol and solvent from the reaction solutions;

(d) heating the polyamic acid to 300°-500° C. to effect substantially complete alcohol and solvent removal, dehydration of the polyamic acid, formation of the corresponding polyimide and reflow of the polyimide, the polyimide having a $T_g$ of 250°-330° C. and containing repeating polymer units having at least 2 flexible linkages or 1 flexible linkage derived from the dianhydride, provided the amine groups of the diamine are in the meta position relative to each other.

In a second aspect, the invention is directed to a composition for the application of planar polyimide coatings to a substrate comprising a solution in aprotic-solvent of an aromatic dianhydride which has been at least 20% esterified with a volatile alcohol and a substantially equimolar amount of aromatic diamine, the dianhydride and diamine containing a total of at least 2 flexible linkages, or the dianhydride and diamine each containing at least 1 flexible linkage, or the dianhydride containing at least 1 flexible linkage, provided the amine groups of the diamine are in the meta position relative to each other.

BRIEF DESCRIPTION OF THE DRAWING

The drawing consists of two figures.

PRIOR ART

Figure 1:
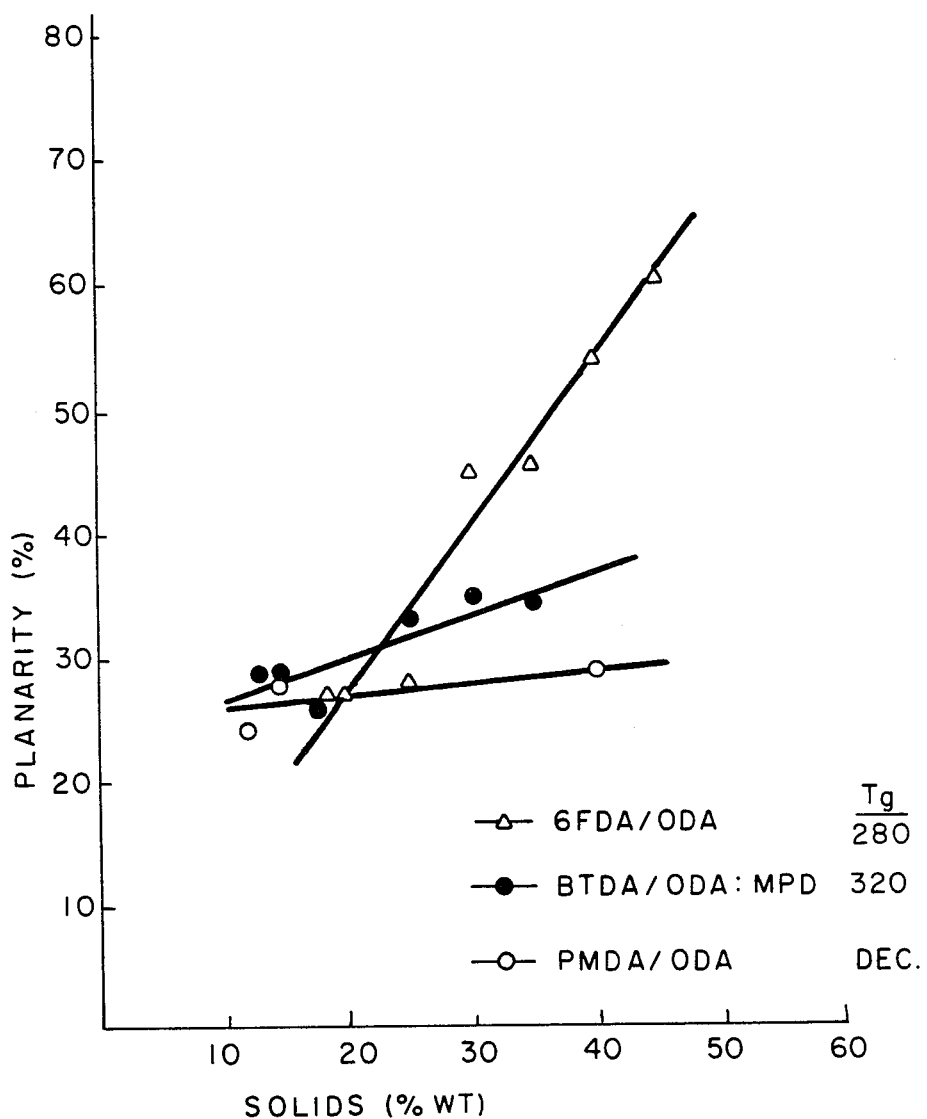
FIG. 1 is a plot of the correlation of planarity with % weight solids for the compositions of the invention compared with other polyamides.

U.S. Pat. No. 3,190,856 to Lavin et al is directed to polyamides which are the polycondensation products of (a) a tetracarboxylic acid anhydride containing the benzophenone radical and (b) a $C_{6-16}$ aromatic primary amine.

U.S. Pat. No. 3,347,808 to Lavin et al is directed to coating compositions which are a solution of (a) a benzophenone tetracarboxylic acid or $C_{1-6}$ alkyl diester thereof and (b) either a $C_{2-6}$ aliphatic primary diamine or a $C_{6-36}$ aliphatic aromatic primary diamine and/or triamine.

DETAILED DESCRIPTION OF THE INVENTION

The preparation of polyamic acid precursors of polyimides is carried out by condensation polymerization of dianhydrides and diamines in an aprotic solvent medium. Therefore, suitable aprotic solvents for the method of the invention are N-methyl pyrrolidone, dimethylacetamide, dimethyl sulfoxide and dimethylformamide. N-methyl pyrrolidone is a particularly preferred solvent for use in the invention. Mixtures of the solvents can be used as well to adjust the volatility of the solvent medium. The solvent should, however, be substantially free of water to avoid the formation of reaction by-products with the dianhydride reactants. Solvents having a water content of no more than 0.1% wt. are preferred.

The choice of both the dianhydrides and the diamines is quite important in the method of the invention since they must yield polyimides which are low melting, i.e., that melt and flow at 350°-450° C. Thus, the polyimide should have a $T_g$ of 250°-330° C. and preferably 260°-320° C.

In order to obtain polyimides having these characteristics it is necessary that repeating polymer units contain at least 2 flexible (hinge) linkages or 1 flexible linkage in the dianhydride moiety, provided the diamine contains amine groups which are in the meta position relative to each other. When each repeating polymer unit contains two or more flexible linkages those linkages may be contained on either or both the dianhydride and the diamine. If the repeating polymer unit contains only 1 flexible unit, then it must be in the dianhydride moiety and furthermore the amine moieties of the diamine must be in the meta position relative to each other. The term "flexible" or "hinge" linkage refers to connecting linkages between aromatic groups which are sterically capable of substantial rotation. In Table 1 below are listed several dianhydrides and diamines having suitable flexible linkages.

TABLE 1

Aromatic Dianhydrides and Diamines Containing Flexible Interaromatic Linkages

| | | Abbreviation |
|---|---|---|
| I | Dianhydrides | |
| | Oxydiphthalic anhydride | ODPA |
| | 2,2-bis(3,4-benzene carboxylic acid anhydride)propane | 6PDA |
| | 2,2-(benzophenone tetracarboxylic acid dianhydride) | BTDA |
| | 2,2-bis(3,4-benzenedicarboxylic acid anhydride)perfluoropropane | 6FDA |
| | 2,2-bis-[4-(3,4-dicarboxyphenoxy)phenyl]hexafluoropropane | BFDA |
| | Diphenylsulfone tetracarboxylic acid dianhydride | CSDA |
| II | Diamines | |
| | Diaminobenzophenone | DABP |
| | Methylene dianiline | MDA |
| | Oxydianiline | ODA |
| | 2,2-bis(p-dianiline)perfluoropropane | 6FDAm |
| | Thiodianiline | TDA |
| | 1,8-bis(4-aminothiophenoxy)perfluorooctane | ATPPO |
| | 4,4'-(p-aminobenzoyldiphenyl)ether | BABDE |
| | Resorcinal bis-aniline | RBA |
| | Diaminosulfone | MDAS |

In view of the foregoing criteria it can be seen that aromatic dianhydrides such as pyromellitic dianhydride (PMDA) are not generally suitable for use in the invention since they contain no flexible linkages. Similarly diaminosulfone (DAS) 1,5-diaminonaphthalene (1,5 ND) and paraphenylene diamine (PPD) are not suitable for the same reason. However diamines such as meta-phenylenediamine and 3,5-diaminobenzoic acid, which also have no flexible interaromatic linkages, can be used because their amine groups are positioned in the meta position relative to each other. However, they must be used in conjunction with a dianhydride having at least 1 flexible group.

Though it is preferred that the polyimides of the invention be made from dianhydride and diamines meeting the above configurational criteria, it will be recognized that other dianhydrides and diamines which are not generally suitable can be used so long as the resultant copolymers have $T_g$ values within the range of 250°–330° C. and preferably 260°–320° C.

The alcohols which are suitable for carrying out the diesterification step of the invention are volatile monoalcohols, i.e., those which have atmospheric boiling points below 200° C., and which will be evaporated from solution when they are heated to 200°–300° C. Virtually any alcohol of the formula ROH is suitable so long as it meets the volatility criterion and the R group does not undergo any secondary reactions. Thus lower ($C_{1-6}$) alkanols and benzyl alcohol, phenol and cresol are all suitable, as are lower molecular weight ether alcohols such as ethylene or propylene glycol monoalkyl ethers. Polyols are not, however, suitable since they would form polyesters.

The amount of volatile alcohol should be sufficient to esterify at least 20% of the acid groups of the dianhydride and preferably at least 40%. It is undesirable to esterify less than 20% of the acid groups since the polymers made therefrom will be too high in molecular weight and therefore be too highly viscous to allow high solids solutions, which are necessary to give good layer planarity. As the degree of diesterification is increased, higher solids solutions are obtained which result in less shrinkage during cure and therefore give more planar coatings.

The esterification reaction between the dianhydride and alcohol is best carried out at 50°–100° C. to obtain fast reaction rates without volatilizing any substantial amount of the alcohol. No catalyst is required. Furthermore, the resultant half ester remains substantially unreactive with aromatic diamines until the ester groups (R groups) are driven off upon heating the solution to about 200° C.

Upon admixing the amines with the dianhydride half ester at room temperature, no formation of polyamic acid will taken place. However, polycondensation and the formation of polyamic acid will take place quite readily with any unesterified dianhydride in the solution.

It will ordinarily be preferred that approximately equimolar proportions of the reactants be used in the reaction system in order that adequate polymer molecular weight can be obtained. For this reason, neither the dianhydride/diamine ratio nor the diamine/dianhydride ratio should be less than 0.95. Within these approximately equimolar proportions, it is possible to obtain strong high molecular weight polyimides having an intrinsic viscosity (IV) of 0.3–0.9 as measured in N-methyl pyrrolidone at 25° C. Within the above-described limits, effective control of molecular weight can be obtained and molecular weight distribution is more narrow. Outside of the preferred stoichiometric range, molecular weights become too low and a wide range of molecular weight distribution is obtained.

The above-described solution of dianhydride half ester, diamine, aprotic solvent and, to the extent that any of the dianhydride is not esterified, polyamic acid oligomers can be applied to a substrate by any suitable method such as spraying, spinning, screen printing, dipping and the like. However, regardless of the method of application, it is desirable that the concentration of polymer precursors be as high as possible in order to avoid high shrinkage of the finished polyimide coating. For this reason, it is not practicable to obtain planarity merely by solvent dilution. Instead, the method of the invention is designed to obtain planarity by providing high solids solutions of precursors of polyimides which are capable of reflowing at high temperatures to provide planar coatings.

After application to the substrate, the composition is heated to 200°–300° C. to effect de-esterification of the dianhydride half ester. At this temperature the alcohol which is formed therefrom, is vaporized from the solution as well as part of the aprotic solvent. The dianhydride then reacts freely by polycondensation with the aromatic diamine to form the corresponding polyamic acid. As the polyamic acid is heated further to 300°–500° C., it is dehydrated and converted to the corresponding polyimide which reflows to form a planar coating.

EXAMPLES

Examples 1

Into a three-neck 500 ml round bottom flask equipped with a thermometer, mechanical stirrer, drying tube and heating mantle were charged 88.8 g (0.2 mole) of 6 FDA, 7.4 g (0.16 mole) of ethanol and 100 g of N-methyl pyrrolidone (NMP). The mixture was heated at 100° C. for one hour to diesterify the 6FDA partially and cooled down to 40° C. To the clear reaction mixture was added a solution of 40 g of ODA (0.2 mole) in 66.4 of NMP. The reaction mixture was stirred at ambient temperatures for three hours. The final product was a clear, amber solution which had 44.9% solids and a viscosity of 20 poise. It was coated on silicon wafers having metal lines 10 microns wide with 10 microns spaces. The coated wafers were heated for 30 minutes at 200° C., 30 minutes at 300° C. and 20 minutes at 425° C. The planarity of the cured coatings as measured with a Talley Alphastep was 91%.

Example 2

Into a three-neck 500 ml round bottom flask equipped with a thermometer, mechanical stirrer, drying tube and heating mantle were charged 88.8 g (0.2 mole) of 6 FDA, 12.9 g (0.28 mole) of ethanol and 100 g of N-methyl pyrrolidone. The mixture was heated at 100° C. for one hour and cooled down to 40° C. To the clear reaction mixture was added a solution of 40 g of ODA (0.2 mole) in 112.6 g of NMP. The reaction mixture was stirred at ambient temperatures for three hours. The final product was a clear, amber solution which had 40% solids and a viscosity of 96 cps. It was coated on silicon wafters having metal lines 10 microns wide with 10 microns spaces. The coated wafers were heated for 30 minutes at 200° C., 30 minutes at 300° C. and 20 minutes at 425° C. The planarity of the cured coatings measured with a Talley Alphastep was 94%.

Examples 3-17

A series of 15 polyimides was made by the above-described process in which various dianhydrides and diamines were used together. The composition of the polymers and $T_g$ values of each is given in Table 2 below.

TABLE 2

Effect of Flexible Interaromatic Linkages on $T_g$ of Polyimides

| Ex. No. | Dianhydride | Diamine(s) | $T_g$ (°C.) |
|---|---|---|---|
| 3 | CSDA | 65/35 MPD/RBA | 304 |
| 4 | CSDA | 59/41 MPD/RBA | 255 |
| 5 | CSDA | 50/50 MPD/RBA | 267 |
| 6 | 6FDA | 100/0 ODA/PPD | 285 |
| 7 | 6FDA | 62/39 ODA/PPD | 298 |
| 8 | 6FDA | 51/49 ODA/PPD | 304 |
| 9 | 6FDA | 41/59 ODA/PPD | 307 |
| 10 | 6FDA | 25/75 ODA/PPD | 315 |
| 11 | 6FDA | 0/100 ODA/PPD | 326 |
| 12 | 6FDA | 0/100 ODA/1.5 ND | 385 |
| 13 | 6FDA | 65/35 ODA/1.5 ND | 311 |
| 14 | 6FDA | 73/27 ODA/1.5 ND | 305 |
| 15 | 6FDA | 78/22 ODA/1.5 ND | 301 |
| 16 | 6FDA | 50/50 ODA/MPD | 311 |
| 17 | 6FDA | RBA | 229 |

In Examples 3–5 the dianhydride CSDA has a flexible linkage and the diamine RBA has two such flexible linkages. In addition the amine groups of the MPD were in meta relationship. Thus polyimide $T_g$ values were well within the range 250°–330° C.

In Examples 6–10 both the dianhydride 6FDA and the diamine ODA contain flexible linkages. Thus these copolymers in which PPD was used as comonomer had satisfactory $T_g$ despite the fact that PPD contained no flexible linkages. It is apparent that as the amount of nonflexible PPD is increased relative to the more flexible ODA the $T_g$ rises substantially. Indeed when PPD is used as the sole diamine as in Example 11 the $T_g$ approaches the upper end of levels which can be used in the composition of the invention.

Examples 13–15 illustrate polyimide copolymers which have satisfactory $T_g$ values despite the fact that one of the diamines contains no flexible linkages. However when MDA is used as the sole diamine component (Example 12) the $T_g$ of the polyimide soars out of the useful range.

Example 16 illustrates the use of a mixture of diamines one of which has flexible linkages (ODA) and the other (MPD) which has no flexible linkages but the amine groups are in the meta position relative to each other. The $T_g$ of the polyimide was well within the useful range for the invention. The $T_g$ of the polyimide of Example 17 was slightly below the preferred minimum level. Each polymer unit contained 1 flexible linkage from the 6FDA and 2 flexible linkages from the RBA.

Example 18

Figure 2:
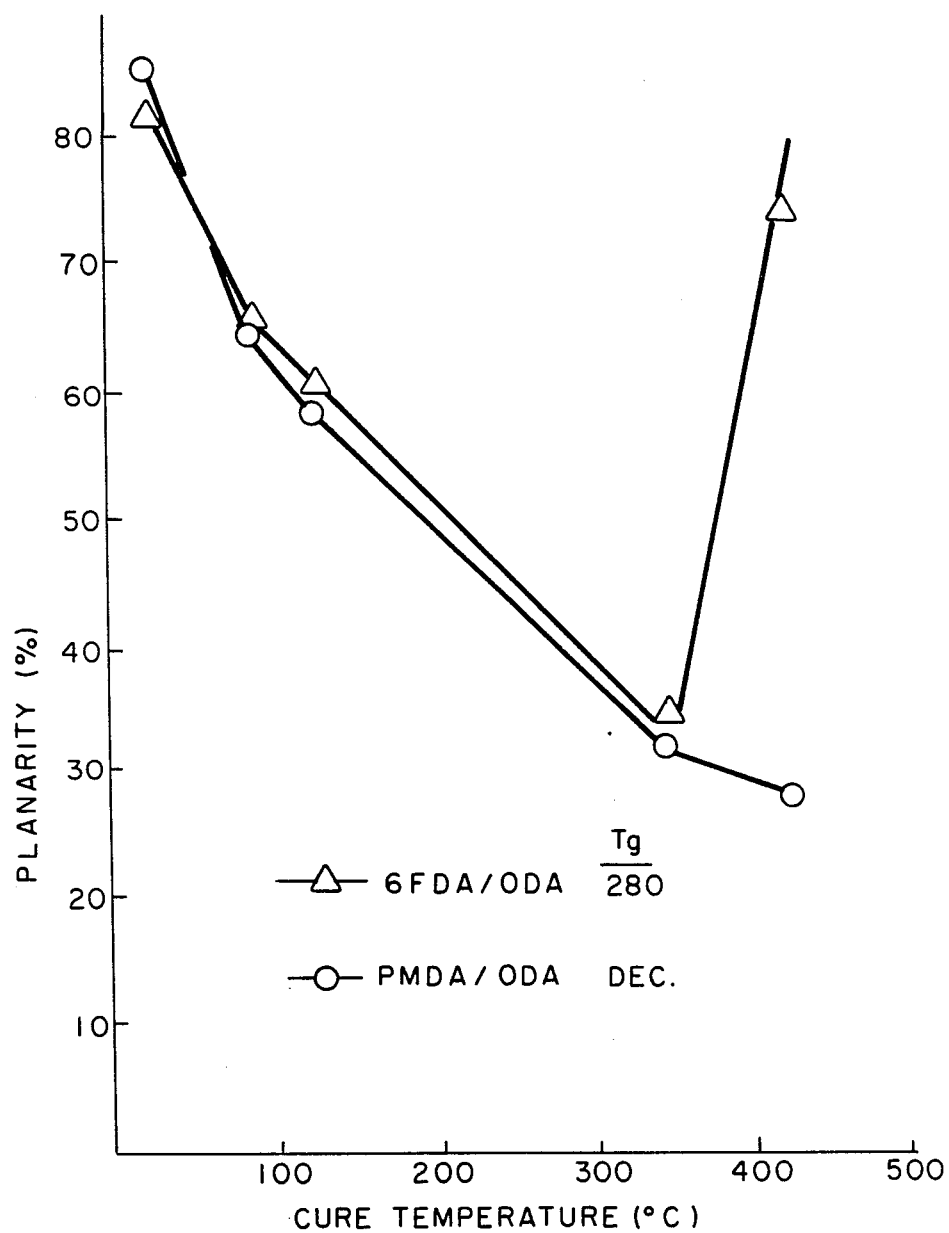
FIG. 2 is a plot of the correlation of planarity as a function of the temperature for the compositions of the invention compared with other polyimides.

A further series of three polyimides was prepared from three combinations of dianhydride and diamines in the manner of the previous examples. Each member of the series was prepared at several different solids levels by varying the degree of dianhydride di-esterification. FIGS. 1 and 2 are plots of the data for this series. The data in FIG. 1 show that the highest solid levels and consequently the highest planarity were obtained when all of the dianhydride and diamine contained flexible linkages. The polyimides in which the dianhydride (PMDA) contain no flexible linkages yielded only quite low planarity. FIG. 2 shows that the planarity of the polyimides decreased substantially as the curing temperature was raised. However, the polymer which had the highest planarity in FIG. 1 (6FDA/ODA) exhibited a substantial increase in planarity upon being heating to above 350° C. because of its reflow capability.

We claim:

1. A method of applying a polyimide coating having high planarity comprising the sequential steps:
   (a) forming a solution in aprotic solvent of an aromatic dianhydride which has been at least 20% diesterified with a volatile alcohol;
   (b) dissolving in the solution of step (a) a substantially equimolar amount of an aromatic diamine;

(c) applying the solution of step (b) to a substrate and heating it to a temperature of 200°–300° C. to effect de-esterification of the dianhydride with the formation of volatile alcohol therefrom, formation of polyamic acid by polycondensation of the dianhydride with the aromatic diamine and vaporization of volatile alcohol and solvent from the reaction solutions; and (d) heating the polyamic acid to 300°–500° C. to effect essentially complete alcohol and solvent removal, dehydration of the polyamic acid, formation of the corresponding polyimide and reflow of the polyimide, the polyimide having a $T_g$ of 250°–330° C. and containing repeating polymer units having at least 2 flexible linkages or at least 1 flexible linkage derived from the dianhydride, provided the amine groups of the diamine are in the meta position relative to each other.

2. A composition for the application of planar polyimide coatings to a substrate comprising a solution in aprotic-solvent of an aromatic dianhydride which dianhydride has been at least 40% esterified with a volatile alcohol and a substantially equimolar amount of aromatic diamine, the dianhydride and diamine containing a total of at least 2 flexible linkages, the dianhydride and diamine each containing at least 1 flexible linkage or the dianhydride containing at least 1 flexible linkage, provided the amine groups of the diamine are in the meta position relative to each other.

3. The composition of claim 2 in which the aromatic dianhydride is 2,2-bis(3,4-benzenecarboxylic acid anhydride)perfluoropropane.

4. The composition of claim 3 in which the aromatic diamine is oxydianiline.

5. The composition of claim 3 in which the aromatic diamine is m-phenylene diamine.

6. The composition of claim 2 in which the volatile alcohol is ethanol.

* * * * *